(12) United States Patent
Zhao et al.

(10) Patent No.: US 12,235,534 B2
(45) Date of Patent: Feb. 25, 2025

(54) SPLICED DISPLAY PANEL AND SPLICED DISPLAY DEVICE

(71) Applicant: TCL China Star Optoelectronics Technology Co., Ltd., Guangdong (CN)

(72) Inventors: Jun Zhao, Guangdong (CN); Bin Zhao, Guangdong (CN); Juncheng Xiao, Guangdong (CN); Hongyuan Xu, Guangdong (CN); Feng Zheng, Guangdong (CN); Wenxue Huo, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/769,792

(22) PCT Filed: Apr. 13, 2022

(86) PCT No.: PCT/CN2022/086625
§ 371 (c)(1),
(2) Date: Apr. 18, 2022

(87) PCT Pub. No.: WO2023/173521
PCT Pub. Date: Sep. 21, 2023

(65) Prior Publication Data
US 2024/0160057 A1    May 16, 2024

(30) Foreign Application Priority Data
Mar. 18, 2022   (CN) .......................... 202210270458.3

(51) Int. Cl.
G02F 1/1339    (2006.01)
G02F 1/1333    (2006.01)
G02F 1/1335    (2006.01)

(52) U.S. Cl.
CPC .... G02F 1/13336 (2013.01); G02F 1/133524 (2013.01); G02F 1/133614 (2021.01);
(Continued)

(58) Field of Classification Search
CPC ............... G02F 1/13336; G02F 1/1339; G02F 1/133614; G02F 2201/44; G02F 2202/28
See application file for complete search history.

(56) References Cited

U.S. PATENT DOCUMENTS

2004/0100184 A1    5/2004   Russ et al.
2006/0108915 A1    5/2006   Cok et al.
2019/0339570 A1*  11/2019   Chen ................... H10K 59/128

FOREIGN PATENT DOCUMENTS

CN    105044964        11/2015
CN    105044964 A  *  11/2015
(Continued)

OTHER PUBLICATIONS

CN 105044964 Translation (Year: 2015).*
(Continued)

Primary Examiner — Paisley L Wilson (57) ABSTRACT

Embodiments of the present application provide a spliced display panel and a spliced display device. In the spliced display panel provided by the embodiments of the present application, a second display module is disposed on a non-display surface of a first display module and corresponding to a spliced region.

16 Claims, 2 Drawing Sheets

(52) U.S. Cl.
CPC ........ *G02F 1/1339* (2013.01); *G02F 2201/44* (2013.01); *G02F 2202/28* (2013.01)

(56) References Cited

FOREIGN PATENT DOCUMENTS

| | | | |
|---|---|---|---|
| CN | 109637381 | | 4/2019 |
| CN | 111640377 | | 9/2020 |
| CN | 111653207 | | 9/2020 |
| CN | 212934616 | | 4/2021 |
| CN | 212934616 U | * | 4/2021 |
| CN | 113990211 | | 1/2022 |
| CN | 215577444 | | 1/2022 |
| CN | 114355658 | | 4/2022 |
| JP | 2004-191487 | | 7/2004 |

OTHER PUBLICATIONS

International Search Report and the Written Opinion Dated Nov. 30, 2022 From the International Searching Authority Re. Application No. PCT/CN2022/086625 and Its Translation Into English. (21 Pages).

Notification of Office Action and Search Report Dated Apr. 24, 2022 From the State Intellectual Property Office of the People's Republic of China Re. Application No. 202210270458.3 and Its Translation Into English.

* cited by examiner

SPLICED DISPLAY PANEL AND SPLICED DISPLAY DEVICE

RELATED APPLICATIONS

This application is a National Phase of PCT Patent Application No. PCT/CN2022/086625 having International filing date of Apr. 13, 2022, which claims the benefit of priority of Chinese Patent Application No. 202210270458.3 filed on Mar. 18, 2022. The contents of the above applications are all incorporated by reference as if fully set forth herein in their entirety.

FIELD AND BACKGROUND OF THE INVENTION

The present application relates to a field of display technology, and more specifically to a spliced display panel and a spliced display device.

Micro light-emitting diode (micro-LED) display technology has developed into one of hotspots of future display technology. Compared with current liquid crystal displays (LCDs) and organic light-emitting diode (OLED) display devices, it has advantages of fast response, high color gamut, high PPI, and low energy consumption. However, the micro-LED technology has many difficulties and is complex, especially that its key technologies such as mass transfer technology and miniaturization of LED particles have become technical bottlenecks.

A mini light-emitting diode (mini-LED), as a product of a combination of a micro-LED and a backplane, has characteristics of high contrast and high color rendering performance comparable to an OLED. Cost of the mini-LED is slightly higher than that of the LCD and is only about 60% of that of the OLED. Compared with the micro-LED and the OLED, the mini-LED is easier to implement. Therefore, the mini-LED has become a hot spot for major panel manufacturers. The micro-LED and mini-LED technologies are collectively defined as an MLED technology, which is the technology of transferring the LED to the backplane and then using devices on the backplane to drive the LED to emit light. Such products can be used as backlight, and small-pitch MLED products can be directly used as display products.

Due to thickness of a sealant, a large-size LCD product has a problem of large seams, resulting in poor display images. During research and practice of the prior art, the inventor of the present application found that at this stage, it is proposed to paste a mini-LED chip on an upper surface of a sealant position of an LCD spliced screen, and then use a system design to achieve an effect of zero seam on a large-size LCD screen. However, due to a higher height of the mini-LED itself and the fact that it is located on the upper surface of the sealant position, the mini-LED has a larger height difference with the LCD display, resulting in a black shadow.

Technical problem: embodiments of the present application provide a spliced display panel and a spliced display device, which can reduce a height difference at a seam of the spliced display panel and improve a display effect at the seam.

SUMMARY OF THE INVENTION

Embodiments of the present application provide a spliced display panel, comprising:

at least two first display modules being spliced, the first display module having a display area and a frame area, the frame areas of the two spliced first display modules being adjacent to each other; the two adjacent frame areas forming a spliced region, and the first display module having a display surface and a non-display surface disposed oppositely; and a second display module, being disposed on one side of the non-display surface away from the display surface, and a projection of the second display module on the non-display surface corresponding to the spliced region.

Optionally, in some embodiments provided in the present application, the first display module comprises an array substrate, a liquid crystal layer, an opposite substrate and a sealant; the array substrate and the opposite substrate are disposed opposite to each other; the sealant is connected between the array substrate and the opposite substrate; the sealant is disposed corresponding to the frame area; the liquid crystal layer is disposed between the array substrate and the opposite substrate; and the liquid crystal layer is disposed corresponding to the display area.

Optionally, in some embodiments provided in the present application, the second display module further comprises a light conversion layer and a light-emitting structure, the light conversion layer is disposed close to one side of the first display module, and the light-emitting structure is disposed on one side of the light conversion layer away from the first display module.

Optionally, in some embodiments provided in the present application, the light conversion layer has a first light conversion sublayer, a second light conversion sublayer and a light-transmitting hole that are disposed in a same layer; the first light conversion sublayer and the second light conversion sublayer are respectively excited to emit light with different color.

Optionally, in some embodiments provided in the present application, the light conversion layer further has a light guide layer, the light guide layer is disposed in the light-transmitting hole.

Optionally, in some embodiments provided in the present application, the light-emitting structure emits a blue light, the first light conversion sublayer emits a red light when excited by the blue light, the second light conversion sublayer emits a green light when excited by the blue light, and the light-transmitting hole is used to transmit the blue light.

Optionally, in some embodiments provided in the present application, the light conversion layer has a first light conversion sublayer, a second light conversion sublayer and a third light conversion sublayer that are disposed in a same layer; the first, second, and third light conversion sublayers are respectively excited to emit light with different color.

Optionally, in some embodiments provided in the present application, the first light conversion sublayer emits a red light when excited by a light emitted by the light-emitting structure, the second light conversion sublayer emits a green light when excited by the light emitted by the light-emitting structure; and the third light conversion sublayer emits a blue light when excited by the light emitted by the light-emitting structure.

Optionally, in some embodiments provided in the present application, the spliced display panel further comprises an optically clear adhesive, a seam is present between adjacent two of the first display modules, and the optically clear adhesive is disposed in the seam and does not exceed the display surface.

Optionally, in some embodiments provided in the present application, the spliced display panel further comprises an optically clear adhesive, and the optically clear adhesive is disposed between the second display module and the non-display surface.

Optionally, in some embodiments provided in the present application, a light transmittance of the sealant is more than 70%.

Optionally, in some embodiments provided in the present application, the second display module deviates from 0 μm to 300 μm inward or outward in at least one side of the spliced region.

Correspondingly, the embodiments of the present application further provide a spliced display device. The spliced display device comprises a spliced display panel and a backlight module. The spliced display panel comprises at least two spliced first display modules and a second display module. The first display module has a display area and a frame area. Two adjacent frame areas form a spliced region. The spliced region is transparent. The first display module has a display surface and a non-display surface disposed oppositely. The second display module is disposed on one side of the non-display surface away from the display surface, and a projection of the second display module on the non-display surface is corresponding to the spliced region. The backlight module is used to provide a backlight for the first display module.

Optionally, in some embodiments provided in the present application, the first display module comprises an array substrate, a liquid crystal layer, an opposite substrate and a sealant; the array substrate and the opposite substrate are disposed opposite to each other; the sealant is connected between the array substrate and the opposite substrate; the sealant is disposed corresponding to the frame area; the liquid crystal layer is disposed between the array substrate and the opposite substrate; and the liquid crystal layer is disposed corresponding to the display area.

Optionally, in some embodiments provided in the present application, the spliced display panel further comprises an optically clear adhesive, a seam is present between adjacent two of the first display modules, and the optically clear adhesive is disposed in the seam and does not exceed the display surface.

Optionally, in some embodiments provided in the present application, the spliced display panel further comprises an optically clear adhesive, and the optically clear adhesive is disposed between the second display module and the non-display surface.

Optionally, in some embodiments provided in the present application, a light transmittance of the sealant is more than 70%.

Optionally, in some embodiments provided in the present application, the second display module deviates from 0 μm to 300 μm inward or outward in at least one side of the spliced region.

Optionally, in some embodiments provided in the present application, the second display module further comprises a light conversion layer and a light-emitting structure, the light conversion layer is disposed close to one side of the first display module, and the light-emitting structure is disposed on one side of the light conversion layer away from the first display module.

Optionally, in some embodiments provided in the present application, the light conversion layer has a first light conversion sublayer, a second light conversion sublayer and a third light conversion sublayer that are disposed in a same layer; the first, second, and third light conversion sublayers are respectively excited to emit light with different color.

Beneficial effect: the embodiments of the present application provide a spliced display panel and a spliced display device. A spliced display device provided by the embodiments of the present application disposes the second display module on the non-display surface of the first display module to cover the spliced region. This design enables the spliced display panel to have a display effect of zero seams when displaying images. Since the second display module is disposed on the non-display surface of the first display module in the spliced display panel provided by the embodiments of the present application, it can ensure that a front surface of the first display modules is flat, which solves the problem of height difference in the spliced region. In addition, a same system is used to control the circuit signals of the first display modules and the second display module, so that the images of the first display modules and the second display module can be merged, and the spliced region can also display the images normally, thereby improving the continuity and integrity of the images displayed by the spliced display panel.

BRIEF DESCRIPTION OF THE SEVERAL VIEWS OF THE DRAWINGS

For more clearly illustrating the technical solutions in the embodiments of the present application, the following will briefly introduce the accompanying drawings used in the description of the embodiments. It is obvious that the accompanying drawings in the following description are only a part of the embodiments of the present application, from which those skilled in the art can derive further figures without making any inventive efforts.

DESCRIPTION OF SPECIFIC EMBODIMENTS OF THE INVENTION

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in the present application, all other embodiments obtained by those skilled in the art without creative work fall within the protection scope of the present application. In addition, it should be understood that the specific embodiments described herein are only used to illustrate and explain the present application, but not to limit the present application. In the present application, unless otherwise stated, the used directional words such as "upper" and "lower" generally refer to the upper and the lower sides of the device in actual use or working state, and specifically refer to the drawing direction in the accompanying drawings; while "inner" and "outer" refer to the device in outline.

The embodiments of the present application provide a spliced display panel and a spliced display device. Each of them will be described in detail below. It should be noted that the description order of the following embodiments is not intended to limit the preferred order of the embodiments.

Figure 1:
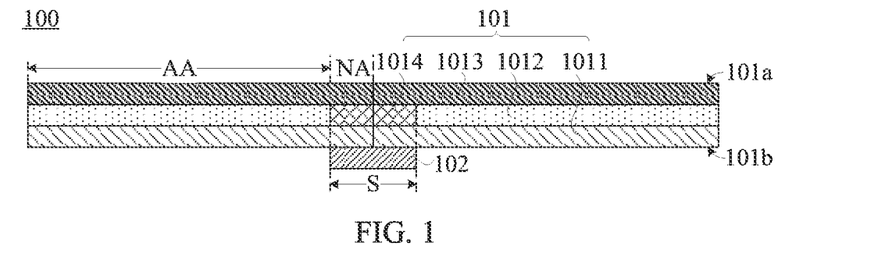
FIG. 1 is a first structural schematic diagram of a spliced display panel provided by embodiments of the present application.
Figure 2:
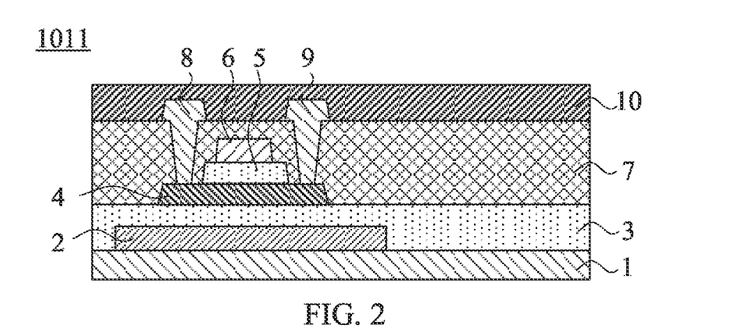
FIG. 2 is a structural schematic diagram of an array substrate in the spliced display panel provided by the embodiments of the present application.

Please refer to FIGS. 1 and 2, FIG. 1 is a first structural schematic diagram of the spliced display panel provided by the embodiments of the present application; and FIG. 2 is a structural schematic diagram of an array substrate in the spliced display panel provided by the embodiments of the present application. The spliced display panel 100 provided by the embodiments of the present application includes at least two spliced first display modules 101 and a second display module 102. The first display module 101 has a display area AA and a frame area NA. The frame areas NA of the two spliced first display modules 101 are disposed adjacent to each other. Two adjacent frame areas NA form a spliced region S. The spliced region S is transparent. The first display module 101 has a display surface 101a and a non-display surface 101b disposed oppositely. The second display module 102 is disposed on one side of the non-display surface 101b away from the display surface 101a, and a projection of the second display module 102 on the non-display surface 101b is corresponding to the spliced region S.

The spliced display panel 100 provided by the embodiments of the present application disposes the second display module 102 on the non-display surface 101b of the first display module 101 and covers the spliced region S. This design enables the spliced display panel 100 to have a display effect of zero seams when displaying images. Because the second display module 102 is disposed on the non-display surface 101b of the first display module in the spliced display panel 100 provided by the embodiments of the present application, it can ensure that a front surface of the first display modules 101 is flat, that is, the display surface 101a is flat, to eliminate a problem of a height difference generated in the spliced region S and the display surface 101a of the first display modules 101. In addition, a same system is used to control circuit signals of the first display module 101 and the second display module 102, so that images of the first display module 101 and the second display module 102 can be merged, and the spliced region S can also display the images normally, thereby improving continuity and integrity of the images displayed by the spliced display panel 100.

Wherein, the display surface 101a referred to in the embodiments of the present application is one side on which the first display module 101 displays the images, and the non-display surface 101b is one opposite side of the display surface 101a. Specifically, the second display module 102 also displays the images on the display surface 101a. In addition, the display surface 101a not only covers the display area AA of the first display module 101, but also covers the non-display area NA of the first display module 101.

Optionally, the projection of the second display module 102 on the non-display surface 101b is corresponding to the spliced region S. It can be that a projected area of the second display module 102 on the non-display surface 101b is equal to an area of the spliced region S, and the second display module 102 correspondingly covers the spliced region S. Since other components may be disposed on the non-display surface 101b of the first display module 101, in order to prevent the second display module 102 from affecting an installation space of other components on the non-display surface 101b, the projected area of the second display module 102 on the non-display surface 101b need be equal to the area of the spliced region S, and it can prevent the second display module 102 from affecting backlight emission of the first display module 101. This design can make the spliced region S get the best spliced display effect. In the product, a certain error between the second display module 102 and the spliced region S can be allowed. Specifically, the second display module 102 may deviate from 0 μm to 300 μm inward or outward in at least one side of the spliced region S. Further, an error value may be 0 μm, 10 μm, 20 μm, 30 μm, 40 μm, 50 μm, 60 μm, 70 μm, 80 μm, 90 μm, 100 μm, 150 μm, 200 μm, 250 μm, or 300 μm. This error may be formed due to a difference between the projected area of the second display module 102 on the non-display surface 101b and the area of the spliced region S, or due to a deviation of alignment, which is not limited in the present application. In addition, this error range can prevent a polarizer from being affected by a mounting error of the polarizer.

It should be noted that, the second display module 102 has the deviation inward in at least one side of the spliced region S, which means that an orthographic projection of the second display module 102 on the non-display surface 101b is located in the spliced region S. Or, the second display module 102 is offset to one side of the spliced region S, so that the second display module 102 deviates inward by a distance on the side of the spliced region S and deviates by the same distance on another side of the spliced region S.

Optionally, a deviation distance of the second display module 102 inward or outward at a peripheral side of the spliced region S is 0 μm. That is, the second display module 102 does not deviate from the peripheral side of the spliced region S. At this time, the second display module 102 is disposed completely corresponding to the spliced region S, and the second display module 102 covers the spliced region S.

Optionally, the first display module 101 includes an array substrate 1011, a liquid crystal layer 1012, an opposite substrate 1013, and a sealant 1014. The array substrate 1011 and the opposite substrate 1013 are disposed opposite to each other. The sealant 1014 is connected between the array substrate 1011 and the opposite substrate 1013. The liquid crystal layer 1012 is disposed between the array substrate 1011 and the opposite substrate 1013. Wherein, the liquid crystal layer 1012 is disposed corresponding to the display area AA. The sealant 1014 is disposed corresponding to the frame area NA. Please refer to FIG. 2, the array substrate 1011 includes a substrate 1, a light-shading layer 2 disposed on the substrate 1, a buffer layer 3 disposed on the substrate and covering the light-shading layer 2, an active layer 4, a gate insulating layer 5, and a gate layer 6 sequentially stacked on the buffer layer 3 from bottom to top, and an interlayer dielectric layer 7 located above the buffer layer 3 and covering the active layer 4, the gate insulating layer 5, and the gate layer 6. A source 8 and a drain 9 are located on the interlayer dielectric layer 7, and the source 8 and the drain 9 are electrically connected with the active layer 4 respectively. A planarization layer 10 covers the source 8 and the drain 9. The array substrate 1011 further includes other structures such as pixel electrodes. The structure of the array substrate 1011 and its specific arrangement are technical means commonly used in the art, and will not be repeated here.

It should be noted that, a structure of a thin film transistor formed in the array substrate 1011 is not limited in the present application. The thin film transistor may be a top-gate thin film transistor, and may also be a bottom-gate thin film transistor; it may be a double-gate thin film transistor, or may also be a single-gate thin film transistor. The specific structure of the thin film transistor will not be introduced in the present application. Optionally, the thin film transistor of the array substrate 1011 in the present application can be a top-gate type. For the top-gate thin film transistor, since there is no overlap between the source 8, the drain 9, and the gate layer 6, it has a lower parasitic capacitance and better ductility, and can reduce delay in a signal transmission process. At a same time, the array substrate 1011 adopts a self-aligned preparation method, which is beneficial to preparation of short-channel devices and improves device characteristics.

Specifically, the active layer 4 can use a material, including any one of indium gallium zinc oxide (Igzo), indium zinc tin oxide (Izto), indium gallium zinc tin oxide (Igzto), indium tin oxide (Ito), indium zinc oxide (Izo), indium aluminum zinc oxide (Iazo), indium gallium tin oxide (Igto) and antimony tin oxide (Ato). The above materials have good conductivity and transparency, high electron mobility, and smaller thicknesses, which will not affect an overall thickness of the display panel. At a same time, the above materials can also reduce harmful electron radiation, ultraviolet light, and infrared light which are harmful to human bodies.

Optionally, please continue to see FIG. 1. A color filter layer and a polarizing layer (not shown in the drawings) are disposed on the opposite substrate 1013. The first display module 101 can emit red, green, and blue light for display. When the first display module 101 wants to display green, the red, green, and blue light pass through a lower polarizing layer on the array substrate 1011 to form a polarized light and enter the liquid crystal layer 1012, the liquid crystal layer 1012 flips in different directions in different sub-pixels, the liquid crystal layer 1012 controls the green light of green sub-pixels to pass through, and blocks the red and blue light of adjacent sub-pixels. Since light conversion efficiency cannot reach 100%, the blue light passing through the liquid crystal layer 1012 of the green sub-pixel may be partially unconverted. This part of unconverted blue light will be filtered by the color filter layer. Therefore, by adopting the above-mentioned opposite substrate 1013, color crosstalk can be prevented, color purity can be improved, and a display effect is enhanced.

Optionally, please continue to see FIG. 1. Light transmittance of the sealant 1014 is more than 70%. The second display module 102 provided in the embodiments of the present application is disposed on the non-display surface 101b of the first display module 101 and is disposed corresponding to the sealant 1014. In order to ensure that the second display module 102 can display normally on the display surface 101a, a material of the sealant 1014 needs to be selected to ensure that the light transmittance thereof is above 70%, thereby improving an optical effect at the spliced region S of the spliced display panel 100. Wherein, the sealant 1014 covers the spliced region S. In this way, light transmittance of the entire spliced region S can be guaranteed, and the second display module 102 corresponding to the spliced region S can display normally on the display surface.

Specifically, the light transmittance of the sealant 1014 can be 70%, 75%, 80%, 85%, 90%, 95%, or 98%. The material of the sealant 1014 is a technology well known to those skilled in the art, so it is not repeated here.

Optionally, the frame area NA cancels the design of metal traces and a black matrix (BM). That is, the frame area NA only disposes the sealant 1014. Since the sealant 1014 is made of a material with a light transmittance of more than 70%, it can be ensured that the display of the second display module 102 is not blocked by the frame area NA.

Figure 3:
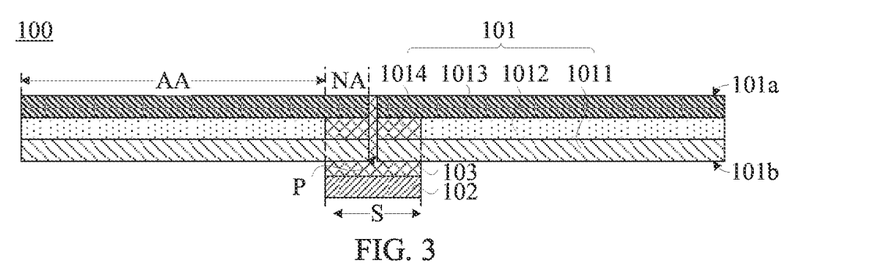
FIG. 3 is a second structural schematic diagram of the spliced display panel provided by the embodiments of the present application.

Optionally, please refer to FIG. 3, FIG. 3 is a second structural schematic diagram of the spliced display panel provided by the embodiments of the present application. There is also a seam P between adjacent two of the first display modules 101. The spliced display panel further includes an optically clear adhesive 103. The optically clear adhesive 103 is disposed in the seam P, and does not exceed the display surface 101a. On one hand, the optically clear adhesive 103 can scatter light of the second display module 102 in the seam P, and can transmit light in the seam P in multiple directions when the spliced display panel 100 displays the image, so the optically clear adhesive 103 can better eliminate the seam. On another hand, the optically clear adhesive 103 can better connect and seal the adjacent two of the first display modules 101.

The optically clear adhesive (OCA) can be one of UV-curable adhesives or thermoset-curable adhesives. A material of the optically clear adhesive includes at least one of organic silica gel, acrylic resin, unsaturated polyester, polyurethane, epoxy resin, and other adhesives. In the embodiments of the present application, the light transmittance of the optical adhesive is greater than 90%.

Further, please continue to see FIG. 3. The optically clear adhesive 103 can also extend to the non-display surface 101b of the first display module 101 in the seam P, and is located between the second display module 102 and the non-display surface 101b. The optically clear adhesive 103 extends to the non-display surface 101b, which facilitates connection between the second display module 102 and the non-display surface 101b.

Figure 4:
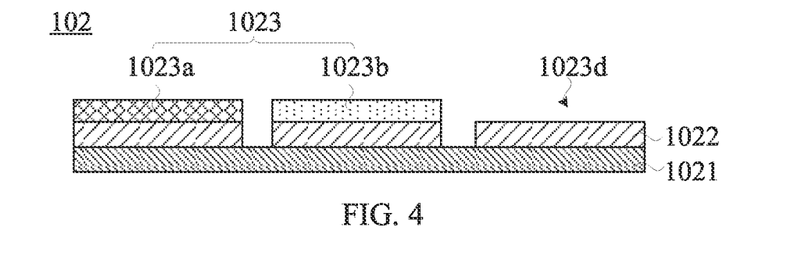
FIG. 4 is a first structural schematic diagram of a second display module in the spliced display panel provided by the embodiments of the present application.

Optionally, please refer to FIG. 4, FIG. 4 is a first structural schematic diagram of the second display module in the spliced display panel provided by the embodiments of the present application. The second display module 102 includes a light-emitting structure 1022 and a circuit structure 1021. The light-emitting structure 1022 is disposed on one side of the circuit structure 1021 close to the first display module 101. The circuit structure 1021 controls the light-emitting structure 1022 to emit light.

Optionally, the light-emitting structure 1022 is one or more combinations of a light-emitting diode (LED) element, a micro light-emitting diode (micro-LED) element, or a mini light-emitting diode (mini-LED) element. The second display module 102 uses these small-sized light-emitting diode elements such as the micro-LED element and the mini-LED element to emit light for display. By improving the process and panel design, it is possible to manufacture a micro-LED light-emitting structure and a mini-LED light-emitting structure with smaller pitches. When the pitch of the LEDs of the micro-LED light-emitting structure and the mini-LED light-emitting structure is reduced, on one hand, a higher-resolution display can be achieved in a narrow seam to enhance the display effect; on another hand, it can visually achieve a borderless effect, which is better fusion with the first display module 101 and makes the display image more continuous and complete.

Wherein, a width of the spliced region S can be determined according to a width of the second display module 102. The spliced region S is formed by splicing the two adjacent frame areas NA in the spliced first display modules 101. When fabricating the frame area NA of the first display module 101, the width of the second display module 102 can be determined first by calculating. Since the second display module 102 is formed by adopting LED chips, a size and pitch of the LED chips can both be determined. Therefore, the width of the second display module 102 can be known.

The width of the spliced region S is determined by the width of the second display module 102, which can better ensure that the projected area of the second display module 102 on the non-display surface 101*b* is equal to the area of the spliced region S, thereby improving the effect of eliminating seams by the second display module 102.

Specifically, the LED elements, the micro-LED elements, or the mini-LED elements can be transferred onto a printed circuit board (PCB), and then one side disposing the LED elements, the micro-LED elements, or the mini-LED elements is pasted on the non-display surface 101*b*. Thus, the splicing of the second display module 102 and the first display module 101 is realized.

Optionally, the second display module 102 further includes light conversion layers 1023. The light conversion layer 1023 is disposed on one side of the light-emitting structure 1022 close to the first display module 101. Wherein, the light conversion layer 1023 may be a quantum dot layer. A particle size of quantum dot (QD) materials is generally between 1 nanometer (nm) and 10 nm. Due to quantum confinement of electrons and holes, a continuous energy band structure becomes a discrete energy level structure, which makes an emission spectrum of the quantum dot materials very narrow. Therefore, quantum dots have high luminescence color purity and wide display color gamut. At a same time, light loss through the sealant 1014 is small, and low power consumption display can be realized.

Wherein, the light conversion layer 1023 may be an up-conversion material. The up-conversion material is a kind of material that can emit short wavelength light under excitation of long wavelength light. This material mostly uses a near-infrared light to excite visible light. A near infrared light source has a high penetration depth. The up-conversion materials have many advantages, such as a large anti-Stokes shift, a long fluorescence life, a high optical stability, a strong chemical stability, and a high signal-to-noise ratio.

Further, a black matrix (BM) layer may be provided in the light conversion layer 1023 of different colors, and the black matrix layer is not shown in the figures. The BM layer can separate the light conversion layer 1023 of different colors, and better prevent light mixing.

Optionally, the light conversion layer 1023 has a first light conversion sublayer 1023*a*, a second light conversion sublayer 1023*b*, and a light-transmitting hole 1023*d* that are disposed in a same layer. The first light conversion sublayer 1023*a* and the second light conversion sublayer 1023*b* are respectively excited to emit light with different colors.

Optionally, the second display module 102 can emit red light, green light, and blue light. For example, the light-emitting structure 1022 may be a blue LED, a blue micro-LED or a blue mini-LED. That is, the light-emitting structure 1022 emits blue light. The first light conversion sublayer 1023*a* can emit the red light when excited by the blue light. The second light conversion sublayer 1023*b* can emit the green light when excited by the blue light. The light-transmitting hole 1023*d* is used to transmit the blue light.

It should be noted that, the display panel 100 provided by the embodiments can dispose a transparent photoresist layer in the light-transmitting hole 1023*d*, so as to keep the second display module 102 from affecting a light exit direction due to falling over. The transparent photoresist layer at least partially fills the light-transmitting holes 1023*d*. That is, the transparent photoresist layer is partially filled in the light-transmitting hole 1023*d* to play a supporting role. Alternatively, the transparent photoresist layer can fill the light-transmitting hole 1023*d* to ensure that light can pass normally.

The structure of the second display module 102 provided in the embodiment disposes the light-transmitting hole 1023*d* in the light conversion layer 1023. In a case where an incident light does not need to undergo color conversion, since the incident light directly exits through the light-transmitting hole 1023*d*, a utilization rate of light can be improved.

Figure 5:
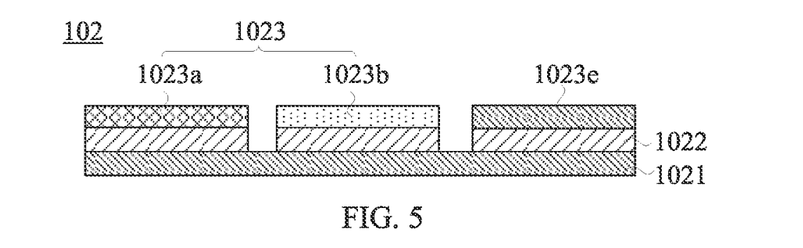
FIG. 5 is a second structural schematic diagram of the second display module in the spliced display panel provided by the embodiments of the present application.

Optionally, please refer to FIG. 5, FIG. 5 is a second structural schematic diagram of the second display module in the spliced display panel provided by the embodiments of the present application. The light conversion layer 1023 further has a light guide layer 1023*e*. The light guide layer 1023*e* is disposed in the light-transmitting hole 1023*d*. Optionally, one side of the light guide layer 1023*e* close to the light-emitting structure 1022 disposes a microstructure. The microstructure can be any tiny structure that can reflect or refract light. For example, the tiny structure includes multiple tiny spheres, hemispheres, diamond-like structures, pyramids, or irregular rough surfaces, etc.

In some embodiments, the light guide layer 1023*e* disposes a plurality of scattering particles therein. After the scattering particles are disposed in the light guide layer 1023*e*, the light can be converted into a form of scattering, random reflection, or diffuse reflection depending on scattering of the scattering particles, thereby optimizing a light divergence degree of the incident light. After passing through the light guide layer 1023*e*, the light can be projected in all directions to increase uniformity of the light.

In some embodiments, the light guide layer 1023*e* is an anisotropic optical film. In the anisotropic optical film, a plurality of structures having a refractive index different from that of a base region of the film are formed along a film thickness direction. The light is refracted and scattered in different directions through these structures.

It can be seen from the above that the light guide layer 1023*e* is different from the light-transmitting hole 1023*d* of FIG. 4. After the light passes through the light-transmitting hole 1023*d*, an original direction of the light will not be changed. However, after the light passes through the light guide layer 1023*e*, incident light in different directions can pass through the sealant 1014 by way of the light guide layer 1023*e*, thereby improving the utilization rate of light. In addition, after the light passing through the light guide layer 1023*e* is reflected, refracted, and scattered by the light guide layer 1023*e*, the emitted light is more uniform and has higher brightness.

Optionally, the second display module 102 can emit red light, green light, and blue light. For example, the first light conversion sublayer 1023*a* may emit the red light when excited by light. The second light conversion sublayer 1023*b* can emit the green light when excited by the light. The light guide layer 1023e allows the blue light to pass through.

The second display module 102 provided in the embodiment disposes the light guide layer 1023e in the light-transmitting hole 1023d. After the light enters the light guide layer 1023e, the light is diffused to various angles, and then exits from a front surface of the light guide layer 1023e through refraction, scattering, and the like. The light guide layer 1023e can make the light emitted more uniform. Under a condition of luminous brightness of a same area, using the light guide layer 1023e has high luminous efficiency and low power consumption.

Figure 6:
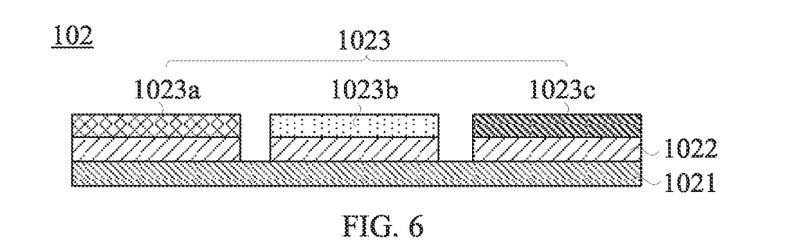
FIG. 6 is a third structural schematic diagram of the second display module in the spliced display panel provided by the embodiments of the present application.

Optionally, please refer to FIG. 6, FIG. 6 is a third structural schematic diagram of the second display module in the spliced display panel provided by the embodiments of the present application. The light conversion layer 1023 has a first light conversion sublayer 1023a, a second light conversion sublayer 1023b, and a third light conversion sublayer 1023c, which are disposed in the same layer. The first light conversion sublayer 1023a, the second light conversion sublayer 1023b, and the third light conversion sublayer 1023c are respectively excited to emit light with different colors.

Optionally, when the second display module 102 emits red light, green light, and blue light, the light-emitting structure 1022 may be a light-emitting structure that emits a laser light, or may be an LED element that emits white light. The first light conversion sublayer 1023a can emit the red light when excited by the light emitted by the light-emitting structure 1022. The second light conversion sublayer 1023b can emit the green light when excited by the light emitted by the light-emitting structure 1022. The third light conversion sublayer 1023c can emit the blue light when excited by the light emitted by the light-emitting structure 1022.

In some embodiment, the second display module 102 can be set to four pixel-colors of red, green, blue, and white (RGBW). The light conversion layer 1023 has the first light conversion sublayer 1023a, the second light conversion sublayer 1023b, and the light-transmitting hole 1023d, which are disposed in the same layer. When the light-emitting structure 1022 emits a white light, the first light conversion sublayer 1023a emits red light under the excitation of backlight, the second light conversion sublayer 1023b emits green light under the excitation of the backlight, the third light conversion sublayer 1023c emits blue light under the excitation of the backlight, and the light-transmitting hole 1023d transmits the white light. The specific display manner is same as the above, and will not be repeated here. Similarly, the light guide layer 1023e may be disposed in the light-transmitting hole 1023d to achieve a better display effect.

It should be noted that the above colors of the light emitted by the first light conversion sublayer 1023a, the second light conversion sublayer 1023b, and the third light conversion sublayer 1023c are only examples, and an arrangement order of the red, green, and blue light is not limited.

Figure 7:
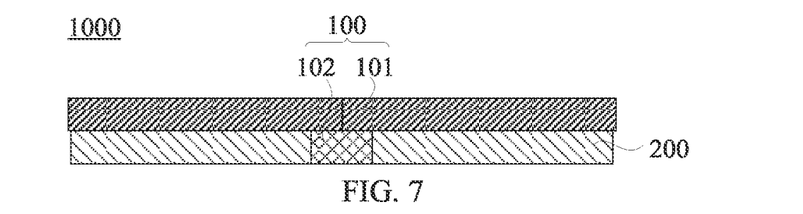
FIG. 7 is a structural schematic diagram of a spliced display device provided by the embodiments of the present application.

Correspondingly, the embodiments of the present application further provide a spliced display device. Please refer to FIG. 7, FIG. 7 is a structural schematic diagram of the spliced display device provided by the embodiments of the present application. The spliced display device 1000 includes the spliced display panel 100 and a backlight module 200. The spliced display panel 100 is the spliced display panel 100 described in any one of the above. The spliced display panel 100 includes the second display module and the at least two spliced first display modules. The backlight module 200 is used to provide backlight for the first display modules.

The spliced display device 1000 provided by the embodiments of the present application includes the spliced display panel 100. The spliced display panel 100 provided by the embodiments of the present application disposes the second display module 102 on the non-display surface of the first display module 101, and the second display module 102 covers the spliced region. This design enables the spliced display panel 100 to have a display effect of zero seams when displaying images. Since the second display module 102 is disposed on the non-display surface of the first display module 101 in the spliced display panel 100 provided by the embodiments of the present application, it can ensure that the front surface of the first display modules 101 is flat. That is, the display surface is flat, which solves a problem of a height difference in the spliced region of the display surface, thereby avoiding dark lines generated in the spliced region. In addition, a same system is used to control circuit signals of the first display modules 101 and the second display module 102, so that the images of the first display modules 101 and the second display module 102 can be merged, and the spliced region can also display the images normally, thereby improving continuity and integrity of the images displayed by the spliced display panel 100.

The spliced display device 1000 provided in the present application can be applied to an electronic equipment, and the electronic equipment can be at least one of a smart phone, a tablet computer, an e-book reader, a computer, a workstation, a server, a media player, a mobile medical machine, a camera, a game console, a vehicle navigator, or an electronic billboard.

The above is the detailed introduction of the spliced display panel and the spliced display device provided by the embodiments of the present application. The principles and implementations of the present application are described herein by specific examples. The descriptions of the above embodiments are only used to help understand the methods and core ideas of the present application. Moreover, for those skilled in the art, according to the idea of the present application, there will be changes in the specific embodiments and application scope. In summary, the content of this specification should not be construed as a limitation to the present application.

What is claimed is:

1. A spliced display panel, comprising:
   at least two first display modules being spliced, a first display module of the at least two first display modules having a display area and a frame area, the frame area being disposed with a sealant, two adjacent frame areas forming a spliced region and the sealant covering the spliced region, the spliced region being transparent, and the first display module having a display surface and a non-display surface disposed oppositely; and
   a second display module, the second display module being disposed on one side of the non-display surface away from the display surface, and a projection of the second display module on the non-display surface corresponding to the spliced region;
   wherein the spliced display panel further comprises an optically clear adhesive having a first adhesive portion and a second adhesive portion, a seam is present between adjacent two of the first display modules, the first adhesive portion is filled in the seam, a first end of the first adhesive portion is flush with the display surface and a second end of the first adhesive portion is flush with the non-display surface, the second adhesive portion is filled between the second display module and the non-display surface, and the second end of the first adhesive portion is connected with a middle of the second adhesive portion to define a T shape.

2. The spliced display panel according to claim 1, wherein the first display module comprises an array substrate, a liquid crystal layer, an opposite substrate, and the sealant; the array substrate and the opposite substrate are disposed opposite to each other; the sealant is connected between the array substrate and the opposite substrate; the sealant is disposed corresponding to the frame area; the liquid crystal layer is disposed between the array substrate and the opposite substrate; and the liquid crystal layer is disposed corresponding to the display area.

3. The spliced display panel according to claim 2, wherein a light transmittance of the sealant is more than 70%.

4. The spliced display panel according to claim 1, wherein the second display module further comprises a light conversion layer and a light-emitting structure, the light conversion layer is disposed close to one side of the first display module, and the light-emitting structure is disposed on one side of the light conversion layer away from the first display module.

5. The spliced display panel according to claim 4, wherein the light conversion layer has a first light conversion sublayer, a second light conversion sublayer, and a light-transmitting hole that are disposed in a same layer; the first light conversion sublayer and the second light conversion sublayer are respectively excited to emit light with different colors.

6. The spliced display panel according to claim 5, wherein, the light conversion layer further has a light guide layer, the light guide layer is disposed in the light-transmitting hole.

7. The spliced display panel according to claim 4, wherein the light conversion layer has a first light conversion sublayer, a second light conversion sublayer, and a third light conversion sublayer that are disposed in a same layer; the first, second, and third light conversion sublayers are respectively excited to emit light with different colors.

8. The spliced display panel according to claim 7, wherein the first light conversion sublayer emits a red light when excited by a light emitted by the light-emitting structure, the second light conversion sublayer emits a green light when excited by the light emitted by the light-emitting structure, and the third light conversion sublayer emits a blue light when excited by the light emitted by the light-emitting structure.

9. The spliced display panel according to claim 4, wherein the light-emitting structure emits a blue light, a first light conversion sublayer emits a red light when excited by the blue light, a second light conversion sublayer emits a green light when excited by the blue light, and a light-transmitting hole is used to transmit the blue light.

10. The spliced display panel according to claim 1, wherein the second display module deviates from 0 μm to 300 μm inward or outward in at least one side of the spliced region.

11. A spliced display device, wherein the spliced display device comprises a spliced display panel and a backlight module, the spliced display panel comprises at least two spliced first display modules and a second display module; a first display module of the at least two first display modules has a display area and a frame area, the frame area being disposed with a sealant, two adjacent frame areas forms a spliced region and the sealant covering the spliced region, the spliced region is transparent; the first display module has a display surface and a non-display surface disposed oppositely; the second display module is disposed on one side of the non-display surface away from the display surface, and a projection of the second display module on the non-display surface corresponds to the spliced region, the backlight module is used to provide a backlight for the first display module; wherein the spliced display panel further comprises an optically clear adhesive having a first adhesive portion and a second adhesive portion, a seam is present between adjacent two of the first display modules, the first adhesive portion is filled in the seam, a first end of the first adhesive portion is flush with the display surface and a second end of the first adhesive portion is flush with the non-display surface, the second adhesive portion is filled between the second display module and the non-display surface, and the second end of the first adhesive portion is connected with a middle of the second adhesive portion to define a T shape.

12. The spliced display device according to claim 11, wherein the first display module comprises an array substrate, a liquid crystal layer, an opposite substrate, and the sealant; the array substrate and the opposite substrate are disposed opposite to each other; the sealant is connected between the array substrate and the opposite substrate; the sealant is disposed corresponding to the frame area; the liquid crystal layer is disposed between the array substrate and the opposite substrate; and the liquid crystal layer is disposed corresponding to the display area.

13. The spliced display device according to claim 12, wherein a light transmittance of the sealant is more than 70%.

14. The spliced display device according to claim 11, wherein the second display module further comprises a light conversion layer and a light-emitting structure, the light conversion layer is disposed close to one side of the first display module, and the light-emitting structure is disposed on one side of the light conversion layer away from the first display module.

15. The spliced display device according to claim 14, wherein the light conversion layer has a first light conversion sublayer, a second light conversion sublayer and a third light conversion sublayer that are disposed in a same layer; the first, second and third light conversion sublayers are respectively excited to emit light with different colors.

16. The spliced display device according to claim 11, wherein the second display module deviates from 0 μm to 300 μm inward or outward in at least one side of the spliced region.

* * * * *